(12) United States Patent
Vogel et al.

(10) Patent No.: US 11,958,141 B2
(45) Date of Patent: Apr. 16, 2024

(54) SYSTEMS AND METHODS TO PROVIDE WELDING-TYPE ARC STARTING AND STABILIZATION WITH REDUCED OPEN CIRCUIT VOLTAGE

(71) Applicant: Illinois Tool Works Inc., Glenview, IL (US)

(72) Inventors: Bernard J. Vogel, Troy, OH (US); Michael D. Madsen, Freemont, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 803 days.

(21) Appl. No.: 16/670,993

(22) Filed: Oct. 31, 2019

(65) Prior Publication Data
US 2021/0129250 A1    May 6, 2021

(51) Int. Cl.
*B23K 9/067*    (2006.01)
*B23K 9/073*    (2006.01)

(52) U.S. Cl.
CPC ............ *B23K 9/067* (2013.01); *B23K 9/0731* (2013.01); *B23K 9/0732* (2013.01); *B23K 9/0734* (2013.01); *B23K 9/0735* (2013.01)

(58) Field of Classification Search
CPC ...... B23K 9/067; B23K 9/073; B23K 9/0673; B23K 9/0731; B23K 9/0732;
(Continued)

(56) References Cited

U.S. PATENT DOCUMENTS 4,492,841 A * 1/1985 Delius ................... B23K 9/073
                                                        219/130.33
6,023,037 A    2/2000 Church
(Continued)

FOREIGN PATENT DOCUMENTS

| CN | 107078662 A | * 8/2017 | ............. B23K 9/093 |
| WO | 9323195 | 11/1993 | |
| WO | 2012162582 | 11/2012 | |

OTHER PUBLICATIONS

European Office Communication with partial European Search Report Appln No. 20201564.0 dated May 14, 2021.
(Continued)

*Primary Examiner* — Nathaniel E Wiehe
*Assistant Examiner* — Ket D Dang
(74) *Attorney, Agent, or Firm* — McAndrews, Held & Malloy, Ltd.

(57) ABSTRACT

Systems and methods to provide welding-type arc starting and stabilization with reduced open circuit voltage are disclosed. An example welding-type power supply includes: power conversion circuitry configured to convert input power to welding-type power; and control circuitry configured to: control the power conversion circuitry to output a voltage pulse at a first voltage; determine whether the power conversion circuitry outputs current during the voltage pulse; in response to determining that there is less than a threshold output current during the voltage pulse, control the power conversion circuitry to turn off an output or output a second voltage that is less than the first voltage; and in response to determining that the power conversion circuitry outputs at least the threshold output current during the voltage pulse, control the power conversion circuitry to output the welding-type power.

14 Claims, 7 Drawing Sheets

(58) Field of Classification Search
CPC .. B23K 9/0734; B23K 9/0735; B23K 9/0953; B23K 9/1006; B23K 9/1056; B23K 9/1062
USPC ............... 219/133, 130.21, 130.1, 130.4
See application file for complete search history.

(56) References Cited

U.S. PATENT DOCUMENTS

| | | |
|---|---|---|
| 6,333,489 B1 | 12/2001 | Reynolds |
| 6,441,342 B1 | 8/2002 | Hsu |
| 9,950,384 B2 | 4/2018 | Vogel |
| 2008/0296276 A1 | 12/2008 | Schartner |
| 2013/0112674 A1* | 5/2013 | Mnich ............... B23K 9/091 219/130.31 |
| 2013/0264323 A1* | 10/2013 | Daniel ............... B23K 9/093 219/137 PS |
| 2015/0251275 A1* | 9/2015 | Denney ............. B23K 26/282 219/121.64 |
| 2016/0311046 A1 | 10/2016 | Aguilar |
| 2017/0252850 A1* | 9/2017 | Ide ..................... B23K 9/125 |
| 2018/0021872 A1* | 1/2018 | Smith ................ B23K 9/1006 219/130.33 |
| 2018/0050412 A1* | 2/2018 | Kadlec ............... B23K 9/1006 |
| 2018/0354050 A1 | 12/2018 | Decoster |

OTHER PUBLICATIONS

European Office Communication with partial European Search Report Appln No. 20201564.0 dated Aug. 18, 2021.

* cited by examiner

SYSTEMS AND METHODS TO PROVIDE WELDING-TYPE ARC STARTING AND STABILIZATION WITH REDUCED OPEN CIRCUIT VOLTAGE

BACKGROUND

This disclosure relates generally to welding-type systems and, more particularly, to systems and methods to provide welding-type arc starting and stabilization with reduced open circuit voltage.

SUMMARY

Systems and methods to provide welding-type arc starting and stabilization with reduced open circuit voltage are disclosed, substantially as illustrated by and described in connection with at least one of the figures, as set forth more completely in the claims.

BRIEF DESCRIPTION OF THE DRAWINGS

The figures are not to scale. Where appropriate, the same or similar reference numerals are used in the figures to refer to similar or identical elements.

DETAILED DESCRIPTION

Conventional welding power supplies, particularly with SMAW processes, operate the power supply circuitry to provide a welding output at times when a welding arc is not present and a welding process is not occurring. Other processes, such as GMAW, FCAW, and/or GTAW, may also have time periods in which the welding output is being driven prior to and/or after the welding process, such as when a torch trigger is pulled or a foot pedal is pressed. Driving the power supply circuitry to output the welding power while the welding process is not occurring causes in a substantial waste of energy.

Certain equipment standards specify a maximum permissible average open circuit voltage. For conventional power supplies configured to drive the output when welding is not occurring to comply with these equipment standards, the output must be below the specified open circuit voltage. By reducing the open circuit voltage, the power supply may have a reduced or delayed response when the operator wants to begin welding and attempts to strike an arc. The reduced or delayed response can make striking of the arc more difficult and/or fail to provide the desired power during the initial moments of the welding process.

Disclosed example systems and methods improve arc initiation, provide reduced average open circuit voltage that complies with applicable equipment standards, and reduce power consumption during periods of non-welding (or other welding-type processes). Example systems and methods output a low open circuit voltage with a series of voltage pulses (e.g., voltage pings) in which the welding power supply output is driven on for a short time duration, followed by a rest period, during which the welding power supply output is limited or shut off. During and/or immediately following the voltage pulse, example systems and methods measure the output current and/or the output voltage of the welding power supply. If the sensed output current and/or output voltage indicate that an arc condition is present (e.g., a welding-type circuit is closed, an arc is being struck, etc.), the control circuitry of the welding power supply and transitions the welding power supply to a welding-type output state. In some examples, the control circuitry may implement one or more steps or phases of an arc start sequence, such as a "hot-start" phase for SMAW processes.

In some examples, the voltage pulse is repeated at intervals or at a repetition rate until an arc is initiated or the power supply is shut down. When the arc is initiated, disclosed examples cease the voltage pulses and control the output of the welding power supply to provide the desired or commanded welding current and/or voltage.

At the end of a welding process, which may be defined or recognized as the loss of a welding arc, for at least a threshold period of time, may be detected by sensing that the output current has fallen below a threshold and/or the output voltage has exceeded a threshold, for at least the threshold period. For example, a loss of the arc may be detected by sensing that the output current has fallen below 10 Amperes for more than 200 milliseconds (ms). In response to the loss of arc, or the end of a welding process, the power supply transitions back to outputting the voltage pulses in the same or similar manner as prior to the arc initiation (e.g., to detect the next arc initiation event).

The average open circuit voltage (OCV) is a function of the voltage pulse duration, the voltage of the voltage pulse, the repetition rate, and the background voltage (e.g., the voltage between the voltage pulses). By controlling the voltage pulse duration, the voltage of the voltage pulse, the repetition rate, and the background voltage, disclosed systems and methods may control the average OCV and provide a reduced average OCV. In some examples, the voltage and duration of the voltage pulses are of sufficient magnitude and duration that current flow will be initiated and detected within the first few voltage pulses as the electrode comes in contact with the work. The voltage magnitude during the voltage pulses may be selected to more readily initiate current flow under less desirable conditions so as to be comparable to arc initiation with full OCV. With a sufficiently high repetition rate (e.g., 1 kiloHertz (kHz)), the delay between voltage pulses will be of a short enough time duration (e.g., 1-2 ms) as the electrode comes in contact with the workpiece, so as to be unnoticeable to the welding operator.

Disclosed systems and methods provide, despite a low OCV, arc initiation with reduced delay and improved performance for sub-optimal welding conditions, such as when oxide or rust are present on the workpiece being welded, when welding with some types of electrodes, when the operator has a low skill level, and/or any other sub-optimal welding conditions.

Disclosed example welding-type power supplies include: power conversion circuitry configured to convert input power to welding-type power; and control circuitry. The control circuitry is configured to: control the power conversion circuitry to output a voltage pulse at a first voltage; determine whether the power conversion circuitry outputs current during the voltage pulse; in response to determining that there is less than a threshold output current during the voltage pulse, control the power conversion circuitry to turn off an output or output a second voltage that is less than the first voltage; and, in response to determining that the power conversion circuitry outputs at least the threshold output current during the voltage pulse, control the power conversion circuitry to output the welding-type power.

In some example welding-type power supplies, the control circuitry is configured to control the power conversion circuitry to repeat the voltage pulse at intervals until at least the threshold output current is detected during the voltage pulse. In some examples, the control circuitry is configured to control the power conversion circuitry to output the welding-type power in a hot-start phase having a current higher than a setpoint current.

In some example welding-type power supplies the control circuitry is configured to: during output of the welding-type power by the power conversion circuitry, monitor an output welding-type current; and in response to determining that the output current is less than a threshold current for at least a threshold time duration, control the power conversion circuitry to decrease an output voltage and control the power conversion circuitry to output the voltage pulse at intervals.

Some example welding-type power supplies further include a voltage sensor configured to measure an output voltage of the welding-type power, in which the control circuitry is configured to: during output of the welding-type power by the power conversion circuitry, monitor the output voltage; and in response to determining that the output voltage is at least a threshold voltage for at least a threshold time duration, control the power conversion circuitry to decrease the output voltage and control the power conversion circuitry to output the voltage pulse at intervals.

In some examples, the voltage pulse is less than 50 microseconds in duration. In some examples, the voltage pulse is less than 20 microseconds in duration. In some example welding-type power supplies, the second voltage is selected such that an average open circuit voltage is less than 12 volts. In some examples, the control circuitry is configured to control the power conversion circuitry to output the second voltage to reduce an average open circuit voltage while arc welding is not occurring.

In some example welding-type power supplies, the welding-type power is the first voltage. In some examples, the control circuitry is configured to: during output of the welding-type power by the power conversion circuitry, monitor the output current of the welding-type power via a current sensor; and in response to detecting that the output current is less than a threshold current, output a predetermined sequence of duty cycles to one or more switching elements of the power conversion circuitry to cause the power conversion circuitry to output voltage pulses to increase the output current during the voltage pulses. In some examples, the power conversion circuitry includes pulse circuitry and welding-type power circuitry, and the control circuitry is configured to: control the pulse circuitry to output the voltage pulse at the first voltage and, in response to determining that there is no output current during the voltage pulse, control the power conversion circuitry to output the second voltage; and control the welding-type power circuitry to output the welding-type power in response to determining that the pulse circuitry outputs current during the voltage pulse.

Some example welding-type power supplies further include a current sensor configured to measure the output current from the power conversion circuitry, in which the control circuitry is configured to determine that there is less than the threshold output current based on a measured output current. Some example welding-type power supplies further include a voltage sensor configured to measure an output voltage from the power conversion circuitry, the control circuitry configured to determine that there is less than the threshold output current based on the measured output voltage.

Some disclosed example welding-type power supplies include: power conversion circuitry configured to convert input power to welding-type power; a current sensor configured to measure a current of the welding-type power; and control circuitry configured to: control one or more switching elements of the power conversion circuitry to output the welding-type power having an output voltage based on duty cycles of the one or more switching elements; monitor an output current of the welding-type power; and while the output current is less than a first threshold current, output a predetermined sequence of duty cycles to the one or more switching elements of the power conversion circuitry to cause the power conversion circuitry to output voltage pulses to increase the output current during the voltage pulses.

In some examples, the control circuitry is configured to output the predetermined sequence of duty cycles to the plurality of switching elements of the power conversion circuitry to power conversion circuitry to repeat the voltage pulses at intervals while the output current is less than a threshold current. In some example welding-type power supplies the control circuitry is configured to, in response to determining that the output current is less than a second threshold current for at least a threshold time duration, control the power conversion circuitry to decrease the output voltage to less than a second voltage and control the power conversion circuitry to output the voltage pulses at intervals.

Some example welding-type power supplies further include a voltage sensor configured to measure an output voltage of the welding-type power, in which the control circuitry is configured to: during output of the welding-type power by the power conversion circuitry, monitor the output voltage; and in response to determining that the output voltage is at least a threshold voltage for at least a threshold time duration, control the power conversion circuitry to decrease an output voltage to less than a second voltage and control the power conversion circuitry to output the voltage pulses at intervals. In some examples, the second voltage is selected such that an average open circuit voltage is less than 12 volts. In some examples, the current pulses are each less than 50 microseconds in duration. In some examples, the current pulses are each less than 20 microseconds in duration.

In some example welding-type power supplies, the one or more switching devices include a plurality of switching devices configured to control the welding-type output, in which the control circuitry is configured to control the plurality of switching devices via pulse width modulated signals having respective duty cycles, and the control circuitry is configured to control the power conversion circuitry to output the current pulses at the first current by controlling the plurality of switching devices using 100% duty cycles. In some example welding-type power supplies, the control circuitry is configured to control the one or more switching elements of the power conversion circuitry to output the welding-type power having the output voltage based on a control loop, and output the predetermined sequence of duty cycles to the one or more switching elements of the power conversion circuitry outside of the control loop.

While examples disclosed below are discussed with reference to shielded metal arc welding (SMAW, also referred to as stick welding), disclosed example systems and methods may be used with any arcing welding-type process including, but not limited to, gas tungsten arc welding (GTAW, also referred to as TIG welding), gas metal arc welding (GMAW), flux cored arc welding (FCAW), plasma cutting, and/or any other arcing process. The magnitude, duration, and/or repetition rate may be selected based on the particular welding-type process being used.

In addition or as an alternative to outputting voltage pulses to reduce average open circuit voltage, disclosed systems and methods output voltage pulses to improve the stability of the welding-type arc during the welding-type process. For example, during GMAW processes the output welding current may drop to a very low current (e.g., less than 10 to 20 Amps). If the current drops too low, the arc may become unstable and extinguish. Some example systems and methods apply a sequence of voltage pulses to the output of the welding power supply 102 during conditions of low current welding to assist the current flow and provide for at least a predetermined minimum flow of current to stabilize the welding arc. The voltage pulse duration and repetition rate may be adjusted according to the particular welding conditions, such as the electrode size and type, shielding gas, preset weld conditions such as voltage and/or current, actual output current, actual output voltage, and/or any other welding conditions.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include power limiting circuitry, output selection circuitry, measurement and/or control circuitry, and/or any other circuits to provide appropriate features.

As used herein, the terms "first" and "second" may be used to enumerate different components or elements of the same type, and do not necessarily imply any particular order. For example, while in some examples a first time occurs prior to a second time within a time period, the terms "first time" and "second time" do not imply any specific order in which the first or second times occur relative to the other within the time period.

The term "welding-type system," as used herein, includes any device capable of supplying power suitable for welding, plasma cutting, induction heating, Carbon Arc Cutting-Air (e.g., CAC-A) and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

As used herein, the term "setpoint" setpoint refers to a target, such as a voltage target or current target, at which the welding-type power is to be output by controlling the power conversion circuitry.

Figure 1:
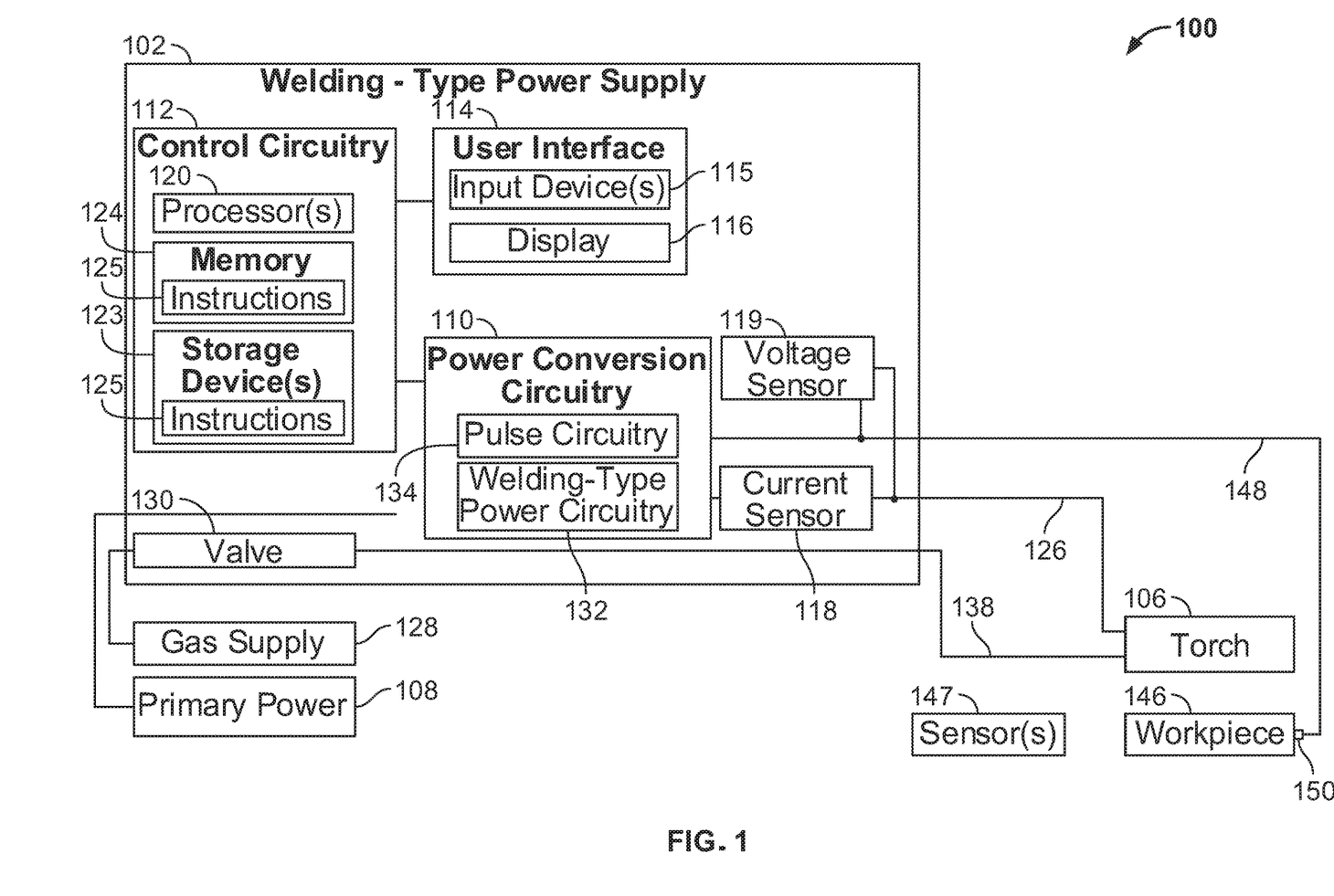
FIG. 1 is a schematic diagram of an example welding system including a welding-type power supply configured to output welding-type power, in accordance with aspects of this disclosure.

Turning now to the drawings, FIG. 1 is a block diagram of an example welding system 100 having a welding-type power supply 102 and a welding torch 106. The welding system 100 powers, controls, and/or supplies consumables to a welding application. In the example of FIG. 1, the power supply 102 directly supplies welding-type output power to the welding torch 106. The welding torch 106 is configured for SMAW, GTAW, GMAW, or FCAW processes, which may be used to perform welding processes involving DC welding-type current.

The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to DC output power as dictated by the demands of the system 100 (e.g., particular welding processes and regimes). The power conversion circuitry 110 converts input power (e.g., the primary power 108) to welding-type power based on a target amperage (e.g., a weld current setpoint) and outputs the welding-type power via a weld circuit including a weld cable 126. The weld cable 126 couples the power conversion circuitry 110 to the torch 106.

The power supply 102 includes control circuitry 112 to control the operation of the power supply 102. The power supply 102 also includes a user interface 114. The control circuitry 112 receives input from the user interface 114, through which a user may choose a process and/or input desired parameters (e.g., a voltage, a current, a frequency, pulse peak current time, a pulse peak current percentage, a pulse background current time, a pulse background current percentage, an AC waveform type, an AC balance, a weld circuit inductance, etc.). The user interface 114 may receive inputs using one or more input devices 115, such as via a keypad, keyboard, physical buttons, switches, knobs, a mouse, a keyboard, a keypad, a touch screen (e.g., software buttons), a voice activation system, a wireless device, etc. Furthermore, the control circuitry 112 controls operating parameters based on input by the user as well as based on other current operating parameters. Specifically, the user interface 114 may include a display 116 for presenting, showing, or indicating, information to an operator.

The control circuitry 112 may also include interface circuitry for communicating data to other devices in the system 100. For example, in some situations, the power supply 102 communicates with a remote interface via a wireless or wired connection, such as by using a network interface controller (NIC) to communicate data via a network (e.g., ETHERNET, 10baseT, 10base100, etc.), and/or. In some examples, the control circuitry 112 communicates with remote interface via the weld circuit.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include predetermined relationships between frequency and amperage, such as one or more look up tables, as described in more detail below.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 138 (which in some implementations may be packaged with the welding power output) to the welding torch 106, which provides the shielding gas to the welding application. In some examples, the welding system 100 does not include the gas supply 128, the valve 130, and/or the cable 138.

The welding torch 106 delivers the welding power and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146.

In some examples, one or more sensors 147 are included with or connected to the welding torch 106 to monitor one or more welding parameters (e.g., power, voltage, current, inductance, impedance, etc.) to inform the control circuitry 112 during the welding process.

The example control circuitry 112 controls the power conversion circuitry 110 to output a low open circuit voltage (e.g., 0V, less than 1V, etc.) with a series of voltage pulses (e.g., voltage pings) in which the output of the power conversion circuitry 110 is driven on for a short time duration, followed by a rest period during which the output of the power conversion circuitry 110 is limited or shut off. During and/or immediately following the voltage pulse, the control circuitry 112 determines or measures the output current (e.g., via the current sensor 118) and/or the output voltage (e.g., via the voltage sensor 119). If the sensed output current and/or output voltage indicate that an arc condition is present (e.g., a welding-type circuit is closed, an arc is being struck, etc.), the control circuitry 112 and transitions the power conversion circuitry 110 to a welding-type output state. In some examples, the control circuitry 112 may implement one or more steps or phases of an arc start sequence, such as a "hot-start" phase for SMAW processes. The "hot-start" phase of an SMAW process may include a phase between arc initiation and a steady state phase, in which the control variable (e.g., current) is set higher than the same variable in the steady-state phase.

In some examples, the voltage pulse is repeated at intervals or at a repetition rate until an arc is initiated or the power supply is shut down. When the arc is initiated, the control circuitry 112 ceases the voltage pulses and controls the output of the power conversion circuitry 110 to provide the desired or commanded welding current and/or voltage.

The example power conversion circuitry 110 of FIG. 1 includes welding-type power circuitry 132 and pulse circuitry 134. The welding-type power circuitry 132 is configured to convert the input power (e.g., the primary power 108) to welding-type power. The control circuitry 112 may control the welding-type power circuitry 132 based on specified parameters, such as current and voltage, which may be configured by the user interface 114 (e.g., via the input device(s) 115). When welding-type power is not needed (e.g., when a welding-type process is not occurring), the control circuitry 112 may shut off the welding-type power circuitry 132 to reduce an open circuit voltage between the torch 106 and the workpiece 146.

The example pulse circuitry 134 is configured to provide voltage pulses to the output of the welding-type power supply 102 (e.g., in parallel with the welding-type output provided by the welding-type power circuitry 132). For example, the control circuitry 112 may enable or turn on the pulse circuitry 134 to output voltage pulses at intervals, while monitoring the output of the pulse circuitry 134 to determine whether current is flowing. Example pulse circuitry 134 may include a switch to selectively couple the pulse circuitry 134 to the input power and/or to selectively couple the pulse circuitry 134 to the output terminals to enable outputting of the voltage pulses. The pulse circuitry 134 may also include an energy storage device, a power converter circuit to output the desired voltage, and/or any other circuitry configured to selectively output the voltage pulses. The control circuitry 112 may control operation of the pulse circuitry 134, or may control connection and disconnection of free-running pulse circuitry 134 to the input and/or output of the welding-type power supply 102.

The pulse circuitry 134 may output a voltage pulse having a greater voltage magnitude than an upper voltage limit of the welding-type power circuitry 132. The pulse circuitry 134 may be configured with sufficient capacity or energy storage to provide an initial flow of current to enable the control circuitry 112 to detect the flow of current and respond by turning on and controlling welding-type power circuitry 132 to output the welding-type power. The higher voltage magnitude of example implementations of the pulse circuitry 134 may advantageously assist in detection of the initial flow of current, particularly for certain electrode types and/or sub-optimal welding conditions.

In some examples, the pulse circuitry 134 may be implemented external to the power conversion circuitry 110 and/or external to the power supply 102 and coupled to the control circuitry 112 via a communications connector or port. However, in some examples, the pulse circuitry 134 is omitted and the control circuitry 112 controls the welding-type power circuitry 132 to output both the welding-type power and the voltage pulses, as described in more detail below. For example, the control circuitry 112 may implement the voltage pulses by briefly enabling the output of the welding-type power circuitry 132 to output a voltage pulse.

Figure 2:
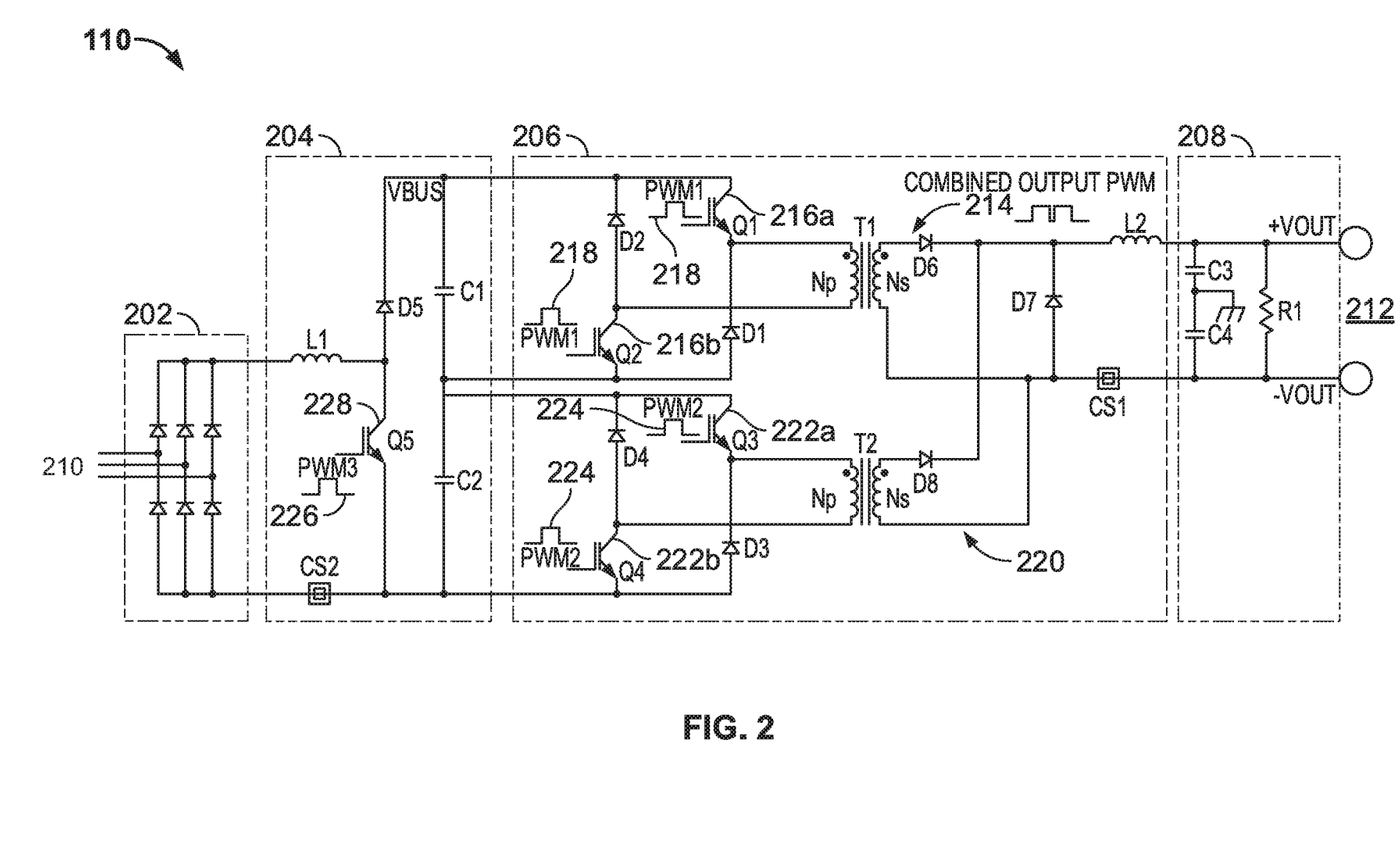
FIG. 2 is a circuit diagram illustrating an example implementation of the power conversion circuitry of FIG. 1.

FIG. 2 is a circuit diagram illustrating an example implementation of the power conversion circuitry 110 and/or the welding-type power circuitry 132 of FIG. 1. The example power conversion circuitry 110 includes a rectifier circuit 202, a pre-regulator circuit 204, a switched-mode power supply circuit 206, and an output circuit 208. The example power conversion circuitry 110 receives input power 210 (e.g., the primary power 108 of FIG. 1) and converts the input power 210 to a welding-type power output 212.

The rectifier circuit 202 receives the input power 210 (e.g., AC input power) and rectifies the input power 210 to output DC power to the pre-regulator circuit 204. The pre-regulator circuit 204 conditions and/or power factor corrects the DC power, and boosts the rectified DC power to output a regulated DC bus voltage to the switched-mode power supply circuit 206.

The example switched-mode power supply circuit 206 of FIG. 2 is a dual forward converter topology configured to receive the regulated DC bus from the pre-regulator circuit 204 and to output a high-current welding-type output power. The switched-mode power supply circuit 206 includes a first forward converter 214 having transistors 216a, 216b that are controlled by a first pulse width modulated (PWM) signal 218, and a second forward converter 220 having transistors 222a, 222b that are controlled by a second PWM signal 224.

The example pre-regulator circuit 204 and the switched-mode power supply circuit 206 are controlled by the control circuitry 112. In particular, the example control circuitry 112 outputs the PWM signals 218, 224, as well as a third PWM signal 226 to control a transistor 228 of the pre-regulator circuit 204.

As mentioned above, during SMAW and/or GTAW welding operations, conventional power supplies continue to output a voltage, so that when an operator attempts to strike an arc the power supply will be prepared to output welding power to the torch 106. However, conventional power supplies output a relatively high open circuit voltage while there is no arc.

To reduce the open circuit voltage to less than a threshold voltage, the example control circuitry 112 controls the power conversion circuitry 110 to reduce the output voltage of the output power 212 while there is no arc, and to output a series of voltage pulses to monitor for a condition in which welding-type power should be output to sustain an arc.

Figure 3:
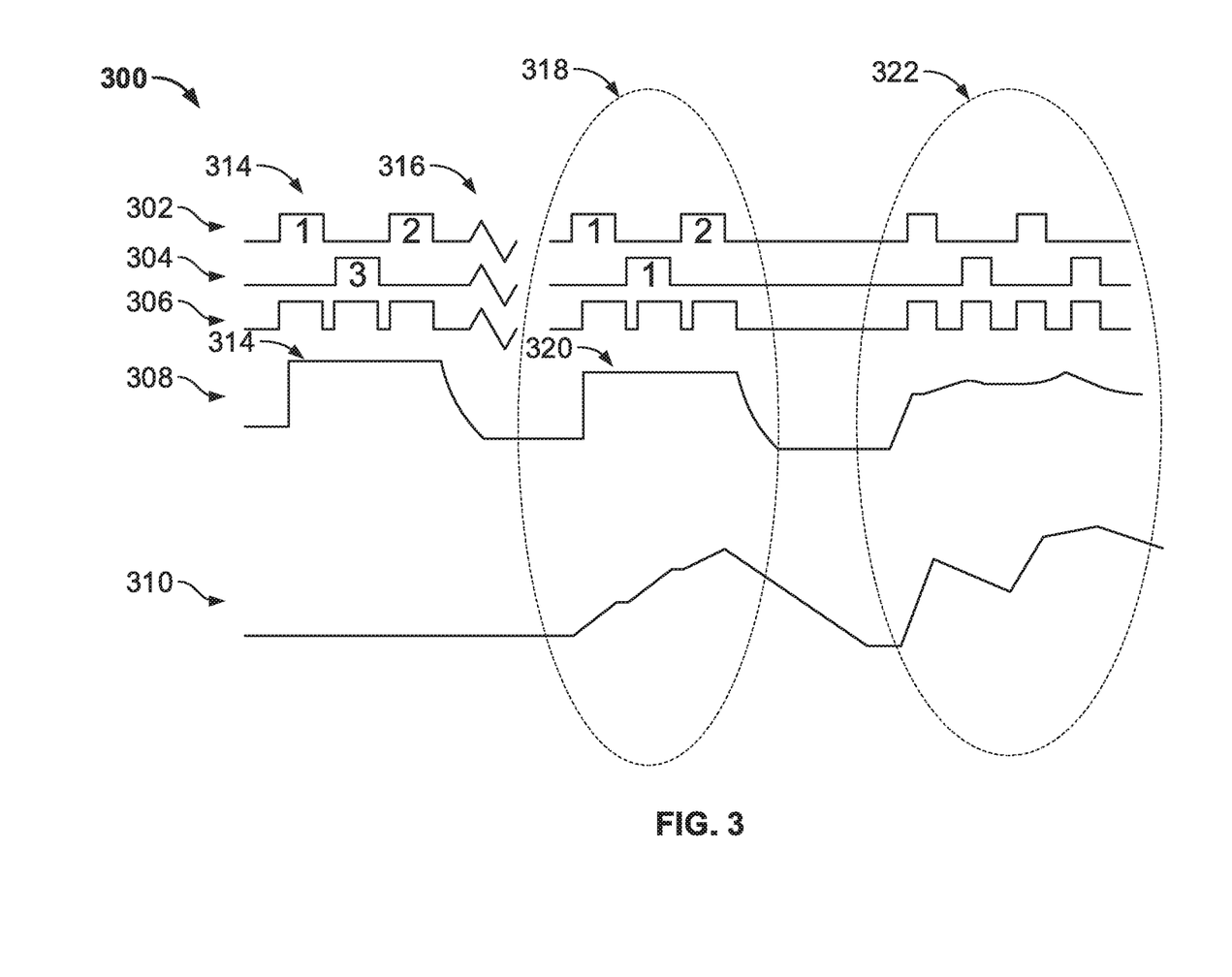
FIG. 3 is a timing diagram illustrating example control signals, output voltages, and output currents associated with the example power conversion circuitry of FIGS. 1 and 2.

FIG. 3 is a timing diagram 300 illustrating example control signals 302, 304, 306, an output voltage 308, and an output current 310 associated with the example power conversion circuitry 112 of FIGS. 1 and 2. The example control signal 302 represents the PWM signal 218, the control signal 304 represents the PWM signal 224, and the control signal 306 represents a combination of the PWM signals 218 and 224. The output voltage 308 and the output current 310 represent the welding-type output 212.

The example timing diagram 300 begins while there is no welding-type output. For example, the control circuitry 112 may shut off the output of the welding-type power by controlling the PWM signals 302, 304 to have a 0% duty cycle. In some other examples, the control circuitry 112 may control the power conversion circuitry 112 to have a reduced output by controlling the PWM signals 302, 304 to have a duty cycle that corresponds to the desired reduced output, which may be specified as less than a threshold voltage. In some examples, the reduced output is selected such that an average open circuit voltage is less than a threshold average voltage when taking into account the voltage pulses. Example threshold average voltages may be 35V, 12V, 9V, 5V, 1V, a voltage incapable of striking an arc, and/or any other desired threshold average voltage.

During a first time period 312 illustrated in the timing diagram 300, the control circuitry 112 controls the power conversion circuitry to output a voltage pulse 314 by controlling the PWM signals 302, 304 to increase the output voltage 308 (e.g., an output voltage of the output 212).

During the voltage pulse 314, the control circuitry 112 monitors the welding-type output 212 to determine whether there is at least a threshold output. For example, the control circuitry 112 may monitor the output 212 using a current sensor (e.g., the current sensor 118 of FIG. 1) and/or a voltage sensor (e.g., the voltage sensor 119 of FIG. 1). The example combined output PWM pulse 308 will generate a voltage pulse of approximately 15 to 20 μs duration, which may include time for output filter capacitors to discharge.

In some examples, the combined PWM signal 306 has a duty cycle of at least 90% during the voltage pulses 314, 320. However, any duty cycle of the combined PWM signal 306 which is capable of outputting at least the threshold current may be used.

The threshold output may correspond to a short circuit between the torch 106 (e.g., an electrode coupled to the torch 106) and the workpiece 146, which closes the welding-type circuit and permits current to flow. In some examples, the threshold output is any output current. In some other examples, the threshold output is any current, because if the welding-type circuit is open then no current would flow during the voltage pulse. In some examples, the control circuitry 112 may determine that at least the threshold current is being output based on the measured voltage (e.g., via the voltage sensor 119) not reaching at least a threshold voltage.

Because there is no welding-type circuit completed during the first time period 312 (e.g., the current 310 does not increase), the example control circuitry 112 controls the power conversion circuitry to decrease or shut off the output power 212 for a time interval 316. At the expiration of the time interval 316 and during a second pulse period 318, the control circuitry 112 controls the power conversion circuitry 110 to output another voltage pulse 320 in a similar or identical manner to the voltage pulse 314.

During the voltage pulse 320, the example torch 106 is in electrical contact with the workpiece 146, causing the power conversion circuitry 110 to output at least a threshold output current driven by the voltage pulse 320. The control circuitry 112 detects (e.g., via the current sensor 118 and/or the voltage sensor 119) the increase in current, and transitions to controlling the power conversion circuitry 110 to output the welding-type power at the welding-type output 212 in accordance with the parameter setpoints (e.g., a current setpoint, a voltage setpoint, etc.) at a time period 322. In some examples, such as when a hot-start mode is enabled for an SMAW process, the example control circuitry 112 transitions to a hot-start mode in response to detecting the current during the voltage pulse 320 prior to transitioning to a steady state welding process.

Figure 4A:
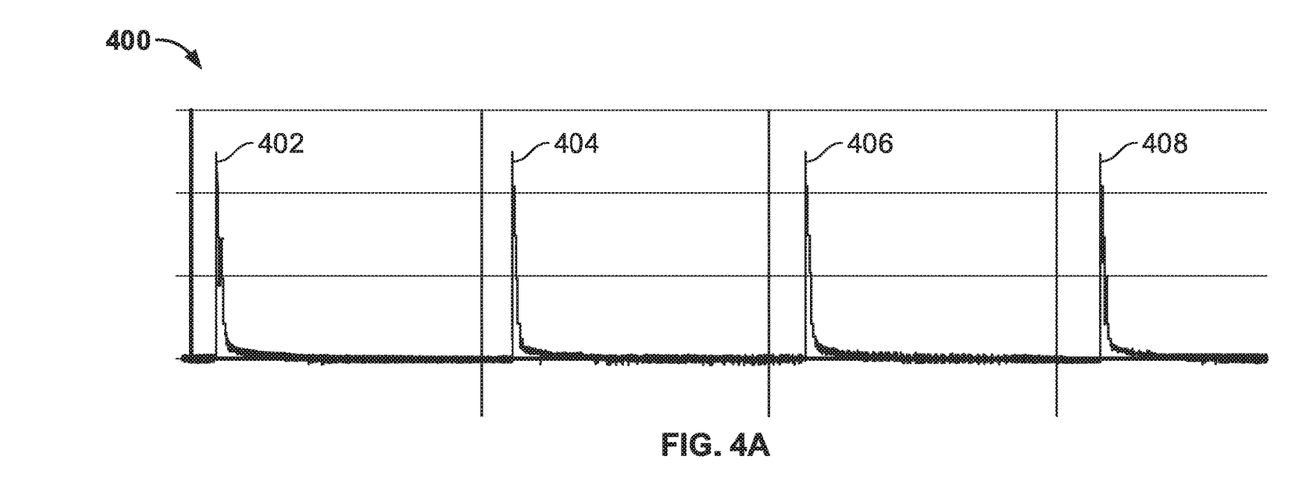
FIG. 4A is a graph illustrating an output voltage of the power conversion circuitry of FIGS. 1 and 2 for a series of voltage pulses

FIG. 4A is a graph 400 illustrating an output voltage of the power conversion circuitry 110 of FIGS. 1 and 2 for a series of voltage pulses 402, 404, 406, 408. As illustrated in FIG. 4A, the control circuitry 112 may control the power conversion circuitry 110 to output the voltage pulses at regular intervals, while reducing the output voltage (e.g., shutting off the output or outputting a lower voltage) between pulses. Thus, the example power supply 102 of FIG. 1 provides a low average open circuit voltage, which reduces the power consumption of the power supply 102 while not performing a welding-type process.

An example set of voltage pulses 402, 404, 406, 408 may have individual durations of 10-20 microseconds (μs), with an interval of approximately 1 millisecond (e.g., a repetition rate of approximately 1 kHz). However, other pulse durations, interval durations, and/or repetition rates may be used.

Figure 4B:
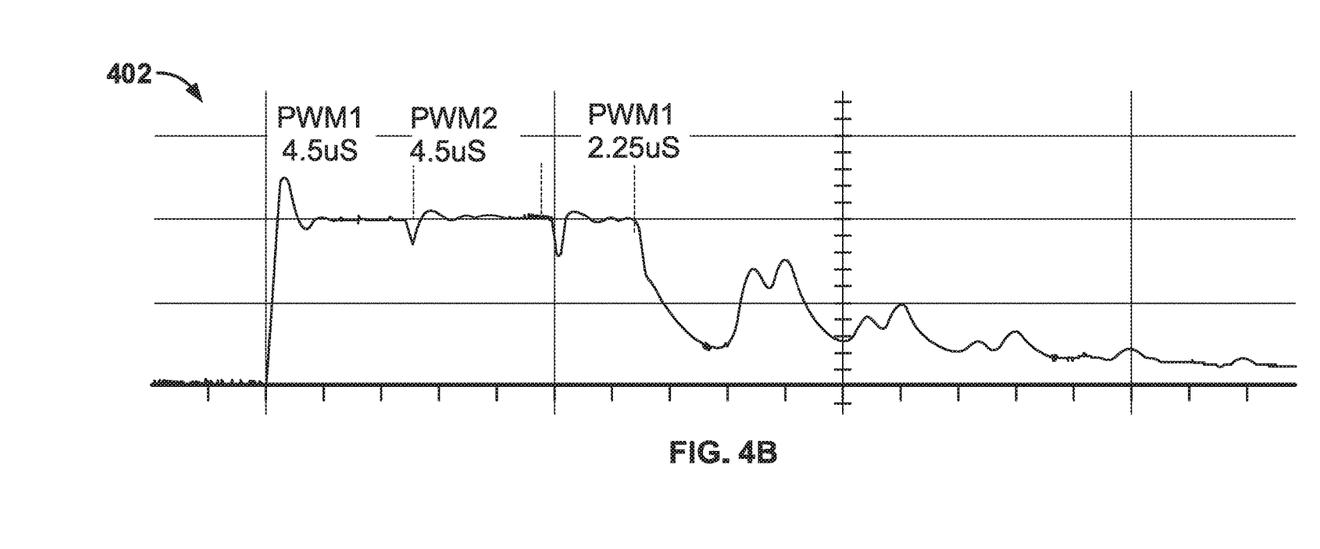
FIG. 4B is a more detailed graph of an example voltage pulse of FIG. 4A.

FIG. 4B is a more detailed graph of an example voltage pulse 402 of FIG. 4A. For this example voltage pulse 402, the PWM signal 224 is enabled for a 45% duty cycle, or 4.5 μs, followed by the PWM signal 218 for a 45% duty cycle, or 4.5 μs, and finally by the PWM signal 224 with a reduced PWM duty cycle of 22.5% or 2.25 μs. In some examples, the control circuitry 112 may adjust the sequence of PWM values that are used to generate the voltage pulse 402, so as to provide more or less energy or voltage in the voltage pulse 402. The voltage pulse sequence may be adjusted based on one or more factors, such as electrode type, weld parameters, the DC bus voltage feeding the switched-mode power supply circuit 206, whether a sleep (e.g., idle) mode is activated, the voltage pulse repetition rate is, and/or any other factors.

Figure 5:
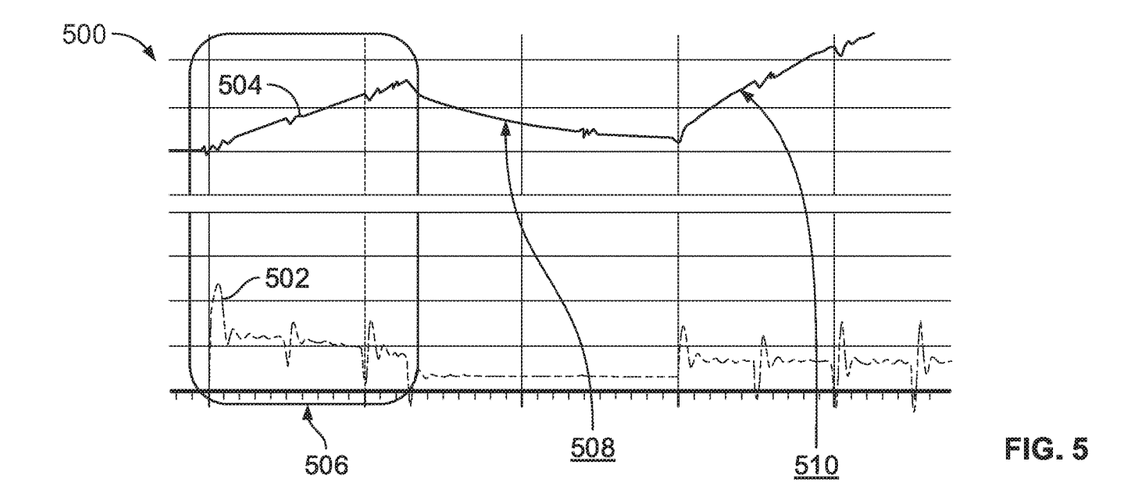
FIG. 5 is a graph illustrating voltages and currents during an example transition from voltage pulses to outputting welding-type power.

FIG. 5 is a graph 500 illustrating an output voltage 502 and an output current 504 of the output power 212 of FIG. 2 during an example transition from voltage pulses to outputting welding-type power. The example graph 500 illustrates a similar detection and transition to a welding-type output as illustrated in FIG. 3. During a first time period 506, the example control circuitry 112 controls the power conversion circuitry 110 to output a voltage pulse, such as while an operator has caused the welding-type electrode and the torch 106 to contact the workpiece 146 to initiate a welding-type process.

During the first time period 506 and/or during a second time period 508, the example control circuitry 112 identifies at least a threshold output current resulting from the voltage pulse. In response to detecting the output current, the control circuitry 112 transitions to the welding-type process starting in a third time period 510, and controls the power conversion circuitry 110 to output the welding-type power.

Figure 6:
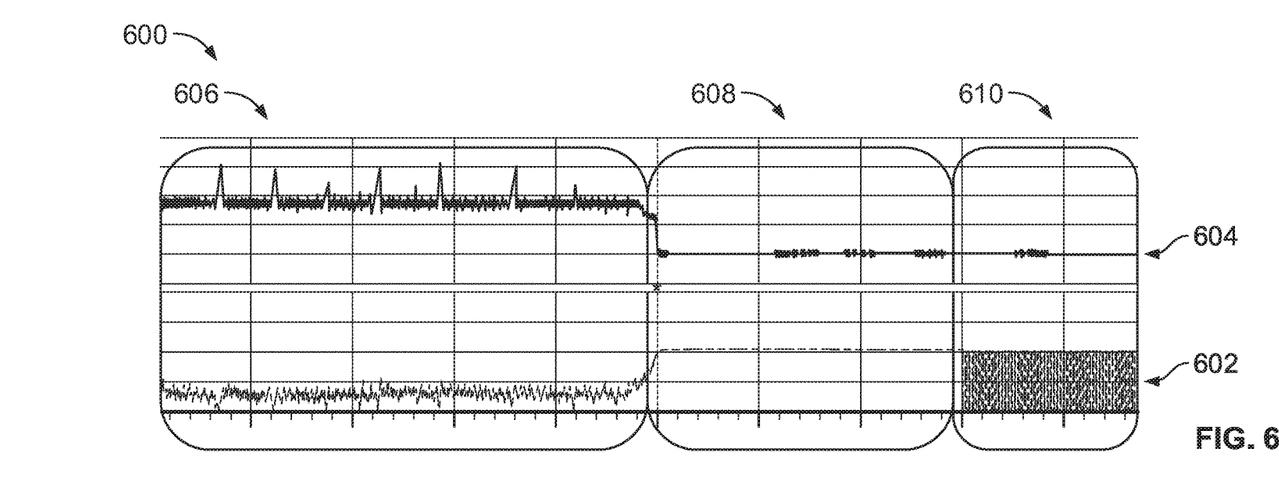
FIG. 6 is a graph illustrating voltages and currents during an example transition from outputting welding-type power to outputting voltage pulses.

FIG. 6 is a graph 600 illustrating an output voltage 602 and an output current 604 during an example transition from outputting welding-type power to outputting voltage pulses. The output voltage 602 and output current 604 represent an end of a welding-type process, when the arc is extinguished and an open circuit voltage exists between the torch 106 and the workpiece 146.

During a first time period 606, the control circuitry 112 controls the power conversion circuitry 110 according to the parameters and/or variables of the ongoing welding-type process. At the end of the first time period 606, the arc is extinguished and the welding-type power supply 102 continues to execute the control loop to control the power conversion circuitry 110 during a second time period 608. The example second time period 608 has a duration equal to a threshold duration. During the second time period 608, the control circuitry 112 monitors the output voltage 602 and/or the output current 604 to determine whether the welding-type process is ended, or whether the arc is reignited. An example threshold duration may be 200 ms to 400 ms, but any duration may be used.

When the arc has been extinguished (e.g., the output voltage 602 is at least a threshold voltage and/or the output current 604 is less than a threshold current) for at least the threshold duration (e.g., the duration of the second time period 608), the control circuitry 112 initiates a series of voltage pulses during time period 610 that are similar or identical to the voltage pulses 314, 320, 402-408 of FIGS. 3, 4A and 4B. For example, the control circuitry 112 may control the PWM signals 218, 224 to cause the power conversion circuitry 110 to output voltage pulses at intervals.

Figure 7:
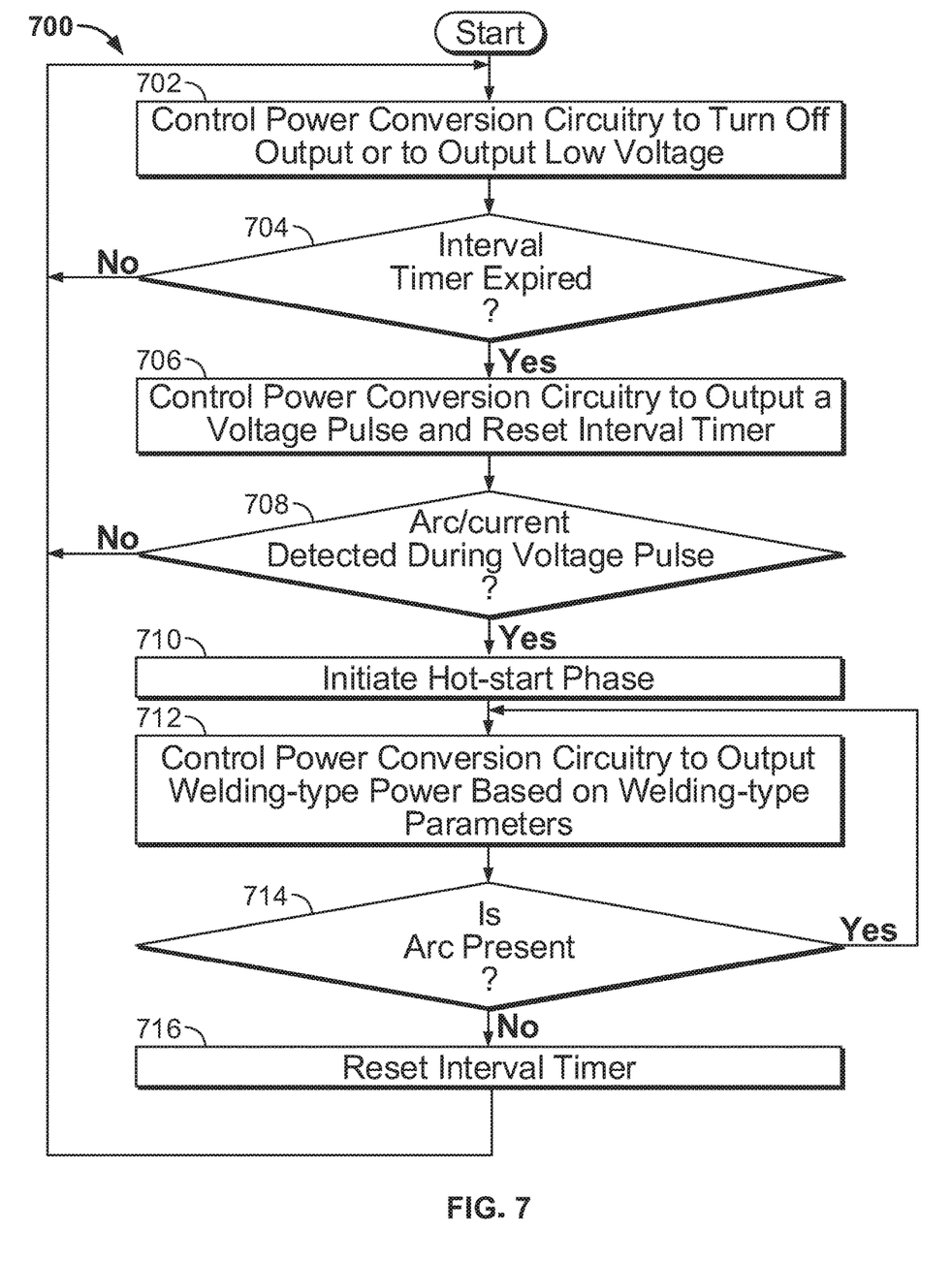
FIG. 7 is a flowchart illustrating example machine readable instructions which may be executed by the welding-type power supply of FIG. 1 to control power conversion circuitry to reduce an open circuit voltage during an open circuit condition.

FIG. 7 is a flowchart illustrating example machine readable instructions 700 which may be executed by the welding-type power supply 102 of FIG. 1 to control the power conversion circuitry 110 to reduce an open circuit voltage during an open circuit condition. The example control circuitry 112 (e.g., the processor(s) 120) may execute the instructions 700 at an initialization of the power supply 102.

At block 702, the control circuitry 112 controls the power conversion circuitry 110 to turn off an output of the power conversion circuitry 110 or to output a low voltage. For example, the control circuitry 112 may output the PWM signals 218, 224 to have low or 0% duty cycles, and/or such that the average output voltage is less than a threshold voltage. An example threshold average output voltage is 12V, but other thresholds may be used.

At block 704, the control circuitry 112 determines whether an interval timer has expired. For example, the control circuitry 112 may output a pulse at regular intervals determined via an interval timer. If the interval timer has not expired (block 704), control returns to block 702.

When the interval timer expires (block 704), at block 706 the control circuitry 112 controls the power conversion circuitry 110 to output a voltage pulse and resets the interval timer. For example, the control circuitry 112 may output the PWM signals 218, 224 to increase the output voltage, such as the pulses 314, 320, 402-408 of FIGS. 3, 4A, and 4B.

At block 708, the control circuitry 112 determines whether an arc and/or current are detected during the voltage pulse. For example, the control circuitry 112 may determine whether at least a threshold output current is detected via the current sensor 118 and/or whether the output voltage is less than a threshold voltage. If an arc or current are not detected during the voltage pulse (block 708), control returns to block 702.

If an arc and/or current are detected during the voltage pulse (block 708), at block 710 the control circuitry 112 controls the power conversion circuitry 110 to initiate a hot-start phase. For example, the hot-start phase may include an increased current relative to the current parameter. In some examples, block 710 may be omitted if a hot-start mode is disabled and/or a GTAW process is used.

At block 712, the control circuitry 112 controls the power conversion circuitry 110 to output welding-type power based on the welding-type parameters. For example, the control circuitry 112 may output the PWM signals 218, 224, 226 to output the welding-type power in accordance with the selected parameters for the welding-type process (e.g., current, voltage, etc.).

At block 714, the control circuitry 112 determines whether an arc is present. For example, the control circuitry 112 may determine whether a current measured by the current sensor 118 is less than a threshold current indicating an extinguishing of the arc and/or whether a voltage measured by the voltage sensor 119 is greater than a threshold voltage. If the arc is still present (block 714), control returns to block 712 to continue controlling the power conversion circuitry 110.

When the arc is no longer present (block 714), at block 716 the control circuitry 112 resets the interval timer and returns control to block 702 to resume outputting the voltage pulses at intervals. For example, the control circuitry 112 may control the power conversion circuitry 110 to transition from the welding-type output to outputting the low open circuit voltage and voltage pulses as illustrated above with reference to FIG. 6.

Figure 8:
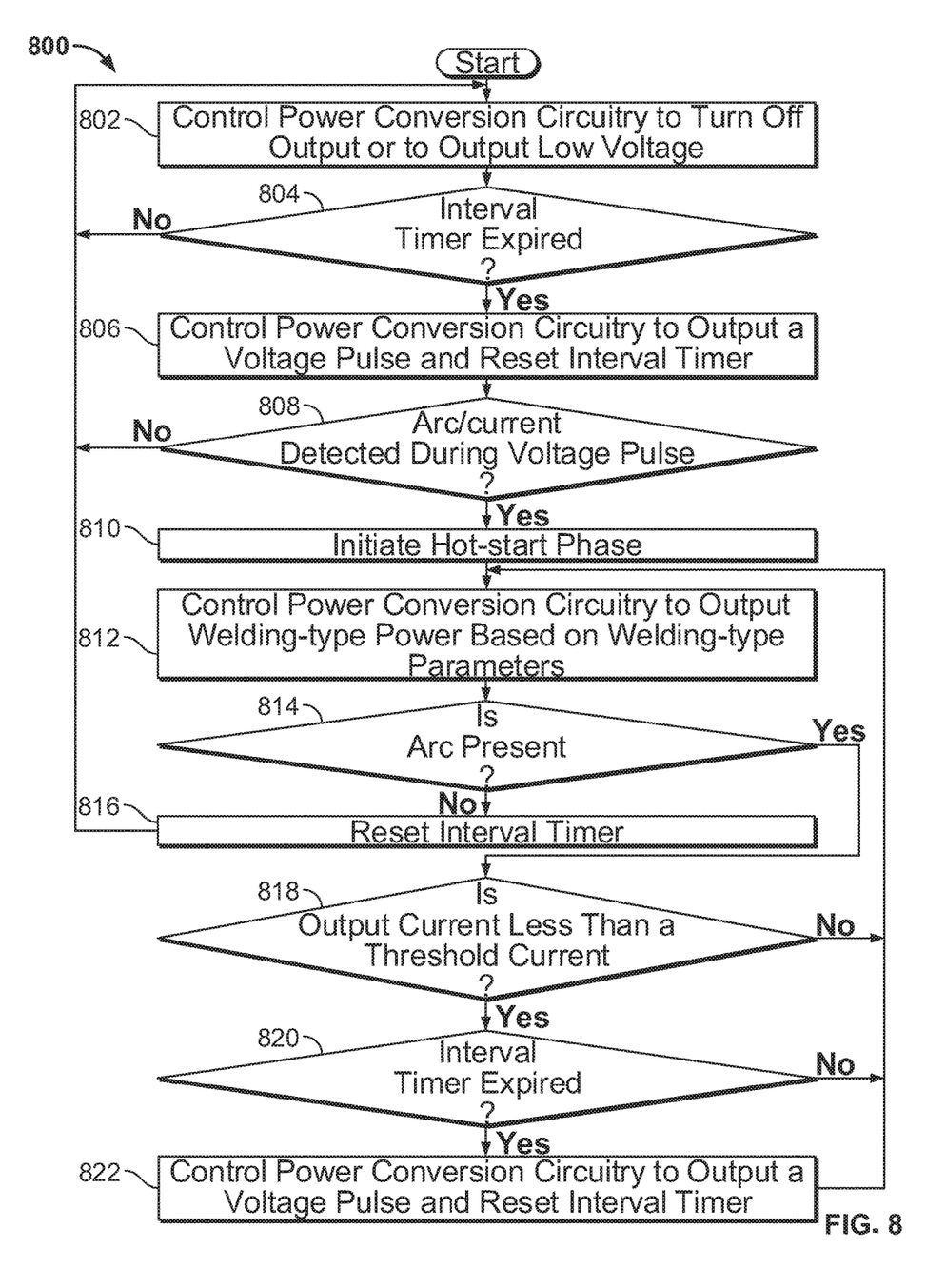
FIG. 8 is a flowchart illustrating example machine readable instructions which may be executed by the welding-type power supply of FIG. 1 to control power conversion circuitry to stabilize an arc during a welding-type process.

FIG. 8 is a flowchart illustrating example machine readable instructions 800 which may be executed by the welding-type power supply of FIG. 1 to control power conversion circuitry to stabilize an arc during a welding-type process. The example instructions 800 of FIG. 8 may be executed by the control circuitry 112 and/or the processor(s) 120 of FIG. 1, and may be executed when the power supply 102 is initialized. In addition to outputting voltage pulses and reducing the average open circuit voltage output by the power supply 102 as disclosed above with reference to FIG. 7, the example instructions 800 output similar voltage pulses when the output current is less than a threshold during the welding-type process to stabilize and/or sustain the arc.

At block 802, the control circuitry 112 controls the power conversion circuitry 110 to turn off an output of the power conversion circuitry 110 or to output a low voltage. For example, the control circuitry 112 may output the PWM signals 218, 224 to have low or 0% duty cycles, and/or such that the average output voltage is less than a threshold voltage. An example threshold average output voltage is 12V, but other thresholds may be used.

At block 804, the control circuitry 112 determines whether an interval timer has expired. For example, the control circuitry 112 may output a pulse at regular intervals determined via an interval timer. If the interval timer has not expired (block 804), control returns to block 802.

When the interval timer expires (block 804), at block 806 the control circuitry 112 controls the power conversion circuitry 110 to output a voltage pulse and resets the interval timer. For example, the control circuitry 112 may output the PWM signals 218, 224 to increase the output voltage, such as the pulses 314, 320, 402-408 of FIGS. 3, 4A, and 4B.

At block 808, the control circuitry 112 determines whether an arc and/or current are detected during the voltage pulse. For example, the control circuitry 112 may determine whether at least a threshold output current is detected via the current sensor 118 and/or whether the output voltage is less than a threshold voltage. If an arc or current are not detected during the voltage pulse (block 808), control returns to block 802.

If an arc and/or current are detected during the voltage pulse (block 808), at block 810 the control circuitry 112 controls the power conversion circuitry 110 to initiate a hot-start phase. For example, the hot-start phase may include an increased current relative to the current parameter. In some examples, block 810 may be omitted if a hot-start mode is disabled and/or a GTAW process is used.

At block 812, the control circuitry 112 controls the power conversion circuitry 110 to output welding-type power based on the welding-type parameters. For example, the control circuitry 112 may output the PWM signals 218, 224, 226 to output the welding-type power in accordance with the selected parameters for the welding-type process (e.g., current, voltage, etc.).

At block 814, the control circuitry 112 determines whether an arc is present. For example, the control circuitry 112 may determine whether a current measured by the current sensor 118 is less than a threshold current indicating an extinguishing of the arc and/or whether a voltage measured by the voltage sensor 119 is greater than a threshold voltage. When the arc is no longer present (block 814), at block 816 the control circuitry 112 resets the interval timer and returns control to block 802 to resume outputting the voltage pulses at intervals. For example, the control circuitry 112 may control the power conversion circuitry 110 to transition from the welding-type output to outputting the low open circuit voltage and voltage pulses as illustrated above with reference to FIG. 6.

If the arc is still present (block 814), the control circuitry 112 determines whether the output current is less than a threshold current. For example, the control circuitry 112 may compare a current measurement by the current sensor 118 to a threshold current that is representative of an increased risk of the arc being extinguished. If the output current is less than the threshold current (block 818), at block 820 the control circuitry 112 enables the voltage pulses and determines whether the interval timer has expired. The interval timer for arc stabilizing voltage pulses may be the same or a different interval timer than the interval timer used for reducing open circuit voltage (e.g., block 804).

If the interval timer has expired (block 820), at block 822 the control circuitry 112 controls the power conversion circuitry 110 to output a voltage pulse and resets the interval timer. For example, while the control circuitry 112 is already outputting the PWM signals 218, 224 to output the current and/or voltage according to the welding-type process, the example control circuitry 112 may increase the duty cycle of the PWM signals 218, 224 during the voltage pulse to temporarily increase the voltage and/or current, thereby stabilizing and/or sustaining the arc. For example, while the PWM signals 218, 224 may be controlled or output by the control circuitry 112 in accordance with a control loop, the control circuitry 112 may respond to determining that the output current is less than the threshold by outputting a predetermined sequence of PWM signals to cause the power conversion circuitry 110 to output a voltage pulse outside of the control loop. The predetermined sequence of PWM signals may be repeated at intervals while the output current is less than the threshold to increase the output current and/or stabilize the arc. The PWM signals 218, 224 to output the stabilization pulse may be similar to the PWM signals 302, 304 of FIGS. 3, 4A, and 4B.

If the output current is not less than the threshold current (block 818), the interval timer has not expired (block 820), or after outputting a voltage pulse (block 822), control returns to block 812 to continue controlling the power conversion circuitry 110 according to the welding-type process.

The present methods and systems may be realized in hardware, software, and/or a combination of hardware and software A typical combination of hardware and software may include one or more application specific integrated circuits and/or chips. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   power conversion circuitry configured to convert input power to welding-type power output; and
   control circuitry configured to:
      while a welding arc is not present, control the power conversion circuitry to output a voltage pulse at a first voltage;
      while the welding arc is not present, determine whether the power conversion circuitry outputs an output current during the voltage pulse;
      in response to the welding arc not being present and the output current being less than a threshold output current during the voltage pulse, control the power conversion circuitry to turn off the welding-type power output or output a second voltage that is less than the first voltage; and
      in response to determining that the power conversion circuitry outputs at least the threshold output current during the voltage pulse, control the power conversion circuitry to begin outputting the welding-type power output.

2. The welding-type power supply as defined in claim 1, wherein the control circuitry is configured to control the power conversion circuitry to repeat the voltage pulse at intervals until at least the threshold output current is detected during the voltage pulse.

3. The welding-type power supply as defined in claim 1, wherein the control circuitry is configured to control the power conversion circuitry to output the welding-type power output in a hot-start phase having a current higher than a setpoint current.

4. The welding-type power supply as defined in claim 1, wherein the control circuitry is configured to:
   during output of the welding-type power output by the power conversion circuitry, monitor the output current; and
   in response to determining that the output current is less than a threshold current for at least a threshold time duration, control the power conversion circuitry to decrease an output voltage and control the power conversion circuitry to output the voltage pulse at intervals.

5. The welding-type power supply as defined in claim 1, further comprising a voltage sensor configured to measure an output voltage of the welding-type power output, wherein the control circuitry is configured to:
- during output of the welding-type power output by the power conversion circuitry, monitor the output voltage; and
- in response to determining that the output voltage is at least a threshold voltage for at least a threshold time duration, control the power conversion circuitry to decrease the output voltage and control the power conversion circuitry to output the voltage pulse at intervals.

6. The welding-type power supply as defined in claim 1, wherein the voltage pulse is less than 50 microseconds in duration.

7. The welding-type power supply as defined in claim 6, wherein the voltage pulse is less than 20 microseconds in duration.

8. The welding-type power supply as defined in claim 1, wherein the second voltage is selected such that an average open circuit voltage is less than 12 volts.

9. The welding-type power supply as defined in claim 1, wherein the control circuitry is configured to control the power conversion circuitry to output the second voltage to reduce an average open circuit voltage while arc welding is not occurring.

10. The welding-type power supply as defined in claim 1, wherein the welding-type power output comprises the first voltage.

11. The welding-type power supply as defined in claim 1, wherein the control circuitry is configured to:
- during output of the welding-type power output by the power conversion circuitry, monitor the output current of the welding-type power output via a current sensor; and
- in response to detecting that the output current is less than a threshold current, output a predetermined sequence of duty cycles to one or more switching elements of the power conversion circuitry to cause the power conversion circuitry to output voltage pulses to increase the output current during the voltage pulses.

12. The welding-type power supply as defined in claim 1, wherein the power conversion circuitry comprises pulse circuitry and welding-type power circuitry, the control circuitry configured to:
- control the pulse circuitry to output the voltage pulse at the first voltage and, in response to determining that there is no output current during the voltage pulse, control the power conversion circuitry to output the second voltage; and
- control the welding-type power circuitry to output the welding-type power output in response to determining that the pulse circuitry outputs current during the voltage pulse.

13. The welding-type power supply as defined in claim 1, further comprising a current sensor configured to measure the output current from the power conversion circuitry, the control circuitry configured to determine that there is less than the threshold output current based on a measured output current.

14. The welding-type power supply as defined in claim 1, further comprising a voltage sensor configured to measure an output voltage from the power conversion circuitry, the control circuitry configured to determine that there is less than the threshold output current based on the measured output voltage.

* * * * *